US009471905B2

(12) United States Patent
Dalal et al.

(10) Patent No.: US 9,471,905 B2
(45) Date of Patent: Oct. 18, 2016

(54) METHODS AND SYSTEMS FOR PROCESSING ELECTRONIC DOCUMENTS

(71) Applicant: Xerox Corporation, Norwalk, CT (US)

(72) Inventors: Edul N Dalal, Webster, NY (US); Wencheng Wu, Webster, NY (US); Yu An Sun, Webster, NY (US); Julien Bourdaillet, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 692 days.

(21) Appl. No.: 13/940,296

(22) Filed: Jul. 12, 2013

(65) Prior Publication Data

US 2015/0019436 A1    Jan. 15, 2015

(51) Int. Cl.
*G06Q 20/04* (2012.01)
*G06K 9/00* (2006.01)

(52) U.S. Cl.
CPC ......... *G06Q 20/042* (2013.01); *G06K 9/00483* (2013.01)

(58) Field of Classification Search
CPC ............... G06F 17/30011; G06F 17/30637; G06K 2209/01; G06K 9/00442; G06K 9/18
USPC ........... 705/26.5, 37, 42, 45; 382/177, 180, 382/181, 185; 245/467; 707/E17.008, 707/E17.059, E17.062, E17.075
See application file for complete search history.

(56) References Cited

U.S. PATENT DOCUMENTS

| | | | |
|---|---|---|---|
| 9,129,095 B1* | 9/2015 | Lam | G06F 21/6218 |
| 2012/0059926 A1* | 3/2012 | Jung | G06F 17/30861 709/223 |
| 2013/0013767 A1* | 1/2013 | Stober | G06F 9/44505 709/224 |
| 2013/0103592 A1* | 4/2013 | Shenk | G06Q 30/08 705/80 |
| 2014/0032406 A1* | 1/2014 | Roach | G06Q 20/042 705/42 |
| 2014/0172603 A1* | 6/2014 | Rondan | G06Q 20/123 705/21 |
| 2014/0379594 A1* | 12/2014 | Alongi | G06Q 30/01 705/318 |

OTHER PUBLICATIONS

"Human OCR: Insights from a Complex Human Computation Process," G. Little and Y. Sun, *CHI 2011*, May 7-12, 2011 (http//crowdresearch.org/chi2011-workshop/papers/little.pdf).

* cited by examiner

*Primary Examiner* — McDieunel Marc (57) ABSTRACT

A method, a system, and a computer program product for processing a plurality of electronic documents are provided. The method includes marking at least one area in an electronic document selected from the plurality of electronic documents. The marked at least one area is then matched with corresponding area in the remaining electronic documents of the plurality of electronic documents. A score is computed for each of the remaining electronic documents of the plurality of electronic documents based on the matching. The plurality of electronic documents is then grouped into one or more groups based on the score.

18 Claims, 6 Drawing Sheets

302 —
```
ABC PRIVATE LTD.
BUILDING NO 112, TOWER A
TRENTON, NJ, USA

PAY TO THE          NJFSPC-CS222538
ORDER OF            PO BOXNO-04258
                    NJ, USA
```

304 —
```
JKL LTD.
112, XY TOWER
NYC, USA

PAY TO THE          NYASPC-CS2212458
ORDER OF            PO BOX NO-04777
                    NY, USA
```

306 —
```
ABC PRIVATE LTD.
BUILDING NO 112, TOWER A
TRENTON, NJ, USA

PAY TO THE          NJFSPC-CS222538
ORDER OF            PO BOX NO-04258
                    NJ, USA
```

308 —
```
XYZ LTD.
BLOCK 1, ABC COLONY
CA, CANADA

PAY TO THE          CASPC-CS21245878
ORDER OF            PO BOX NO-12458
                    CA, CANADA
```

METHODS AND SYSTEMS FOR PROCESSING ELECTRONIC DOCUMENTS

TECHNICAL FIELD

The presently disclosed embodiments are directed to a technique for processing electronic documents. More particularly, the presently disclosed embodiments are related to a technique for grouping the electronic documents.

BACKGROUND

Currently, many applications facilitate printed forms as applicable in events such as, but not limited to, checks, bank account opening, mobile connection, electricity connection, and health or insurance claim forms by digitizing each field in the respective forms using Optical Character Recognition (OCR) techniques. The processing of such printed forms is usually performed in back offices of the respective organizations. In many practical processing applications, the OCR is not successful, due to presence of watermarks, impressions, or low-resolution images within the printed forms. This leads to resorting to manual labor, which may then be costly in terms of both time and money.

SUMMARY

According to embodiments illustrated herein, there is provided a method implementable on a computing device for processing a plurality of electronic documents. The method includes marking at least one area in an electronic document selected from the plurality of electronic documents. The marked at least one area is then matched with corresponding area in the remaining electronic documents of the plurality of electronic documents. A score is computed for each of the remaining electronic documents of the plurality of electronic documents based on the matching. The plurality of electronic documents is then grouped in one or more groups based on the score. The method is performed by a processor in the computing device.

According to embodiments illustrated herein, there is provided a method implementable on a computing device for processing a plurality of paper checks. The method includes receiving a plurality of electronic documents representing scanned copies of the plurality of paper checks to obtain a plurality of electronic documents. At least one area in an electronic document selected from the plurality of electronic documents is then marked. The marked at least one area is matched with corresponding area in the remaining electronic documents of the plurality of electronic documents. A score is computed for each of the remaining electronic documents of the plurality of electronic documents based on the matching. The plurality of electronic documents is then grouped in one or more groups based on the score. Finally, the method includes validating whether the marked at least one area in each electronic document grouped within a group from the one or more groups are matching. The method is performed by one or more processors in the computing device.

According to embodiments illustrated herein, there is provided a system for processing a plurality of electronic documents. The system includes a memory comprising one or more program instruction modules and a processor operable to execute the one or more program instructions modules. The one or more program instruction modules include a selection module, a comparator module, a scoring module, and a grouping module. The selection module is configured for selecting an electronic document from the plurality of electronic documents, and marking at least one area in the selected electronic document. The comparator module is configured for matching the marked at least one area with corresponding area in the remaining electronic documents of the plurality of electronic documents. The scoring module is configured for determining a score for each of the remaining plurality of electronic documents based on the matching. The grouping module is configured for grouping the plurality of electronic documents in one or more groups based on the score.

According to embodiments illustrated herein there is provided a computer program product for use with a computing device. The computer program product includes a non-transitory computer-readable medium having a computer readable program code embodied therein for processing a plurality of electronic documents. The computer readable program code is executable by a processor in the computing device for marking at least one area in an electronic document selected from the plurality of electronic documents. The marked at least one area is then matched with corresponding area in the remaining electronic documents of the plurality of electronic documents. A score is computed for each of the remaining electronic documents of the plurality of electronic documents based on the matching. The plurality of electronic documents is then grouped in one or more groups based on the score.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "computing device" refers to a computer, a device including a processor/microcontroller and/or any other electronic component, device or system that performs one or more operations according to one or more programming instructions. Examples of the computing device include, but are not limited to, a desktop computer, a laptop, a personal digital assistant (PDA), a smartphone, and the like. The computing device is capable of accessing (or being accessed over) a network (e.g., using wired or wireless communication capabilities).

A "network" refers to a medium that interconnects servers and various computing devices. Examples of the network include, but are not limited to, LAN, WLAN, MAN, WAN, and the Internet. The communication over the network may be performed in accordance with various communication protocols such as Transmission Control Protocol and Internet Protocol (TCP/IP), User Datagram Protocol (UDP), and IEEE 802.11n communication protocols.

An "electronic document" or "digital image" or "scanned document" refers to information recorded in a manner that requires a computing device or any other electronic device to display, interpret, and process it. Electronic documents are intended to be used either in an electronic form or as printed output. In an embodiment, the electronic document includes one or more of text (handwritten or typed), image, symbols, and so forth. In an embodiment, the electronic document is obtained by scanning a document using a suitable scanner, a multi-function device, a camera or a camera-enabled device including but not limited to a mobile phone, a tablet computer, desktop computer or a laptop. In an embodiment, the scanned document is a digital image. The digital image refers to a collection of data, including image data in any format, retained in an electronic form. The digital image may contain one or more pictorials, symbols, text, line art, blank or non-printed regions, etc. The digital image may be stored in various file formats, such as, JPG or JPEG, GIF, TIFF, PNG, BMP, RAW, PSD, PSP, PDF, and the like. Hereinafter, the terms "electronic document", "scanned document", "image", and "digital image" are interchangeably used without departing from the scope of the ongoing description.

"Scanning" refers to a technique of recording an image as digital data in any format, thereby creating an electronic document.

An "optical character recognition" or "OCR" operation refers to the conversion of scanned images of handwritten, typewritten, or printed text into machine-encoded text.

"Crowdsourcing" refers to distributing tasks by soliciting the participation of defined groups of users. A group of users may include, for example, individuals responding to a solicitation posted on a certain website, such as Amazon Mechanical Turk or Crowd Flower.

"Crowdworkers" refer to a worker or a group of workers that may perform one or more tasks that generate data that contribute to a defined result, such as proofreading a part of a digital version of an ancient text or analyzing a small quantum of a large volume of data. According to the present disclosure, the crowdsourced workforce includes, but is not limited to, a satellite center employee, a rural business process outsourcing (BPO) firm employee, a home-based employee, or an internet-based employee. Hereinafter, "crowdsourced workforce," "crowdworker," "remote worker", and "crowd" may be interchangeably used.

A "task" refers to the work/assignment given to a remote worker. The task is uploaded on to a crowdsourcing platform (for example, Amazon's Mechanical Turk) from where it may be accessed by remote workers/crowdworkers.

Figure 1:
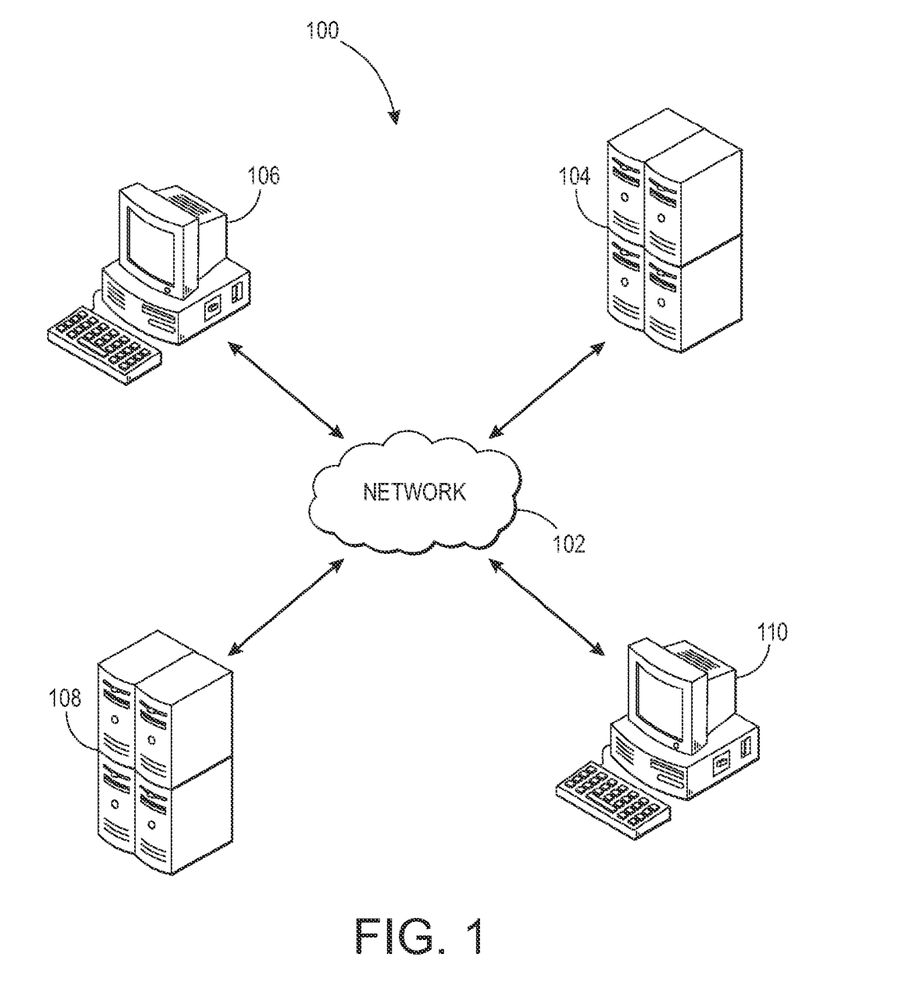
FIG. 1 is a block diagram illustrating an environment in which various embodiments may be implemented.

FIG. 1 is a block diagram illustrating an environment in which various embodiments may be implemented. The system environment 100 includes a network 102, a first server 104, a first computing device 106, a second server 108, and a second computing device 110. Although FIG. 1 shows two computing devices (e.g., desktop computer) for simplicity, the disclosed embodiments may be implemented for a large number of computing devices, including, but not limited to, laptops, smartphones, PDAs, and various similar handheld devices. Similarly, other devices, such as printers and scanners, may be present in the system environment 100 for facilitating associated functionalities.

A user operating the first computing device 106 is capable of accessing the first server 104 (e.g., an application server hosting an application for grouping electronic documents) and/or the second server 108 (e.g., a crowd sourcing platform server) through the network 102 or directly (i.e., physical access). The functionality of processing the evaluation of the electronic documents may be implemented on at least one of the first server 104, the first computing device 106, the second server 108, or the second computing device 110. In an embodiment, for example, the first computing device 106 is configured to execute the application for facilitating processing of the electronic documents. In another embodiment, the application for facilitating processing of the electronic documents is hosted on the first server 104, which may be accessed at the first computing device 106 through an associated client, or a web-based interface.

In an embodiment, the second server 108 is a crowdsourcing platform server that hosts one or more crowdsourcing platforms and is interconnected to the second computing device 110 (a crowdworker computing device) and the first computing device 106 (a requester computing device) over the network 102. The crowdsourcing platforms accepts a plurality of tasks (hereinafter referred to as "crowdsourced tasks") from the first computing device 106 and sends one or more tasks from the crowdsourced tasks to the second computing device 110. Examples of the one or more tasks include, but are not limited to, selection task, validation task and the like. In an embodiment, the second server 108 (e.g., the crowdsourcing platform server) hosts the application/tool/framework for grouping and data entry of electronic documents.

Figure 2:
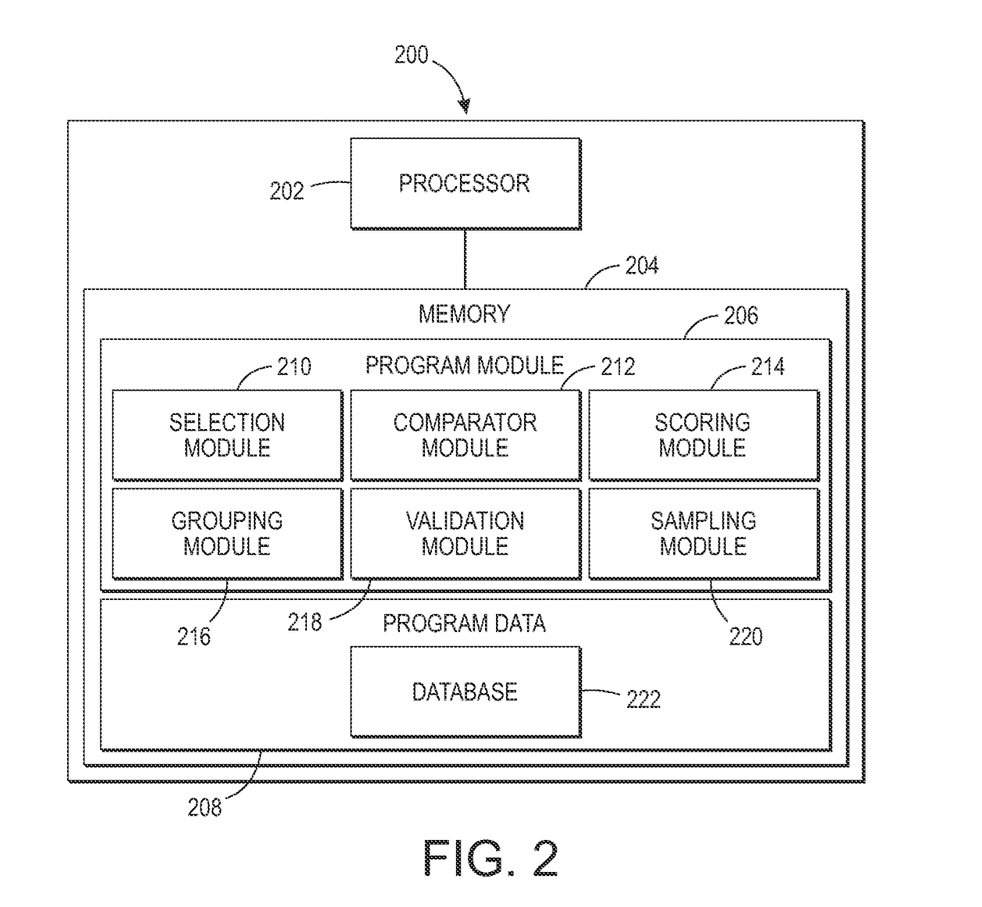
FIG. 2 is a block diagram illustrating a system for processing a plurality of electronic documents, in accordance with at least one embodiment.

FIG. 2 is a block diagram illustrating a system for processing a plurality of electronic documents, in accordance with at least one embodiment. In an embodiment, the system 200 corresponds to the first server 104. In another embodiment, the system 200 corresponds to the first computing device 106.

The system 200 includes a processor 202 coupled to a memory 204. The processor 202 is configured to execute a set of instructions stored in the memory 204 to perform one or more operations. The processor 202 fetches the set of instructions from the memory 204 and executes the set of instructions. The processor 202 may be realized through a number of processor technologies known in the art. Examples of the processor 202 include an X86 processor, a RISC processor, or an ASIC processor. In an embodiment, the processor 202 includes a Graphics Processing Unit (GPU) that executes the set of instructions to perform one or more processing operations.

The memory 204 is configured to store the set of instructions or modules. Some of the commonly known memory implementations can be, but are not limited to, a random access memory (RAM), a read-only memory (ROM), a hard disk drive (HDD), and a secure digital (SD) card. The memory 204 includes a program module 206 and a program data 208. The program module 206 includes a set of instructions that may be executed by the processor 202 to perform specific actions. The program module 206 further includes a selection module 210, a comparator module 212, a scoring module 214, a grouping module 216, a validation module 218, and a sampling module 220.

The program data 208 includes a database 222. The database 222 is a repository that stores the data submitted from and/or required by the selection module 210, the comparator module 212, the scoring module 214, the grouping module 216, the validation module 218, and the sampling module 220. In an embodiment, the database 222 may be implemented using technologies, including, but not limited to, Oracle®, IBM DB2®, Microsoft SQL Server®, Microsoft Access®, PostgreSQL®, MySQL®, and SQLite®.

In an embodiment, the system 200 may include a display (not shown) that facilitates the display of a GUI and interaction with the system 200 in conjunction with the input mediums (not shown). The display may be realized through several known technologies, such as Cathode Ray Tube (CRT)-based display, Liquid Crystal Display (LCD), Light Emitting Diode (LED)-based display, the Organic LED display technology, and the Retina Display technology. Further, the display can be a touch screen capable of receiving user inputs.

In an embodiment, the plurality of paper documents is converted into a plurality of electronic documents. The system 200 includes image-scanning equipment (not shown), which is capable of scanning the plurality of paper documents to generate the corresponding plurality of electronic documents (e.g., digital images). The image-scanning equipment implements various CCD devices and/or CMOS devices to capture images of scanned documents as electronic documents. In an embodiment, the image-scanning equipment implements a linear scanning technique. In another embodiment, the image-scanning equipment implements a two-dimensional scanning technique. Once the scanning is complete, the image-scanning equipment stores the plurality of electronic documents (e.g., the digital images) in the database 222.

In an alternative embodiment, the system 200 receives the electronic documents (e.g., the scanned paper documents) from a scanner or a multifunction device connected in the network 102.

Thereafter, the sampling module 220 obtains the plurality of electronic documents from the database 222. After obtaining the plurality of electronic documents, the sampling module 220 is configured to mitigate at least one of scan noise or one or more watermarks present in the plurality of electronic documents by processing the electronic documents. The processed plurality of electronic documents are then stored in the database 222. It will be apparent to a person having ordinary skill in the art that each electronic document of the plurality of electronic documents may be processed independently and the processing time of each electronic document of the plurality of electronic documents may vary from one another. Mitigating the scan noise or one or more watermarks is described later.

The selection module 210 is configured to select an electronic document from the plurality of electronic documents stored in the database 222.

In an embodiment, the selection module 210 presents a user interface to the user of the first computing device, e.g., the requester, for selecting the electronic document from the plurality of electronic documents.

In another embodiment, the selection module 210 is configured to transmit the plurality of electronic documents to one or more remote workers. In order to transmit the plurality of electronic documents, the selection module 210 creates a selection task corresponding to the plurality of electronic documents for the one or more remote/crowd workers. The selection task is then distributed to the one or more remote workers. In an embodiment, the selection module 210 prepares the selection tasks, and publishes the selection tasks on a crowdsourcing platform for access by the one or more remote workers. In an embodiment, Amazon's Mechanical Turk (MTurk) may be used to publish the selection tasks. In another embodiment, CrowdFlower may be used to publish the selection tasks. It will be understood by a person having ordinary skill in the art that any suitable crowdsourcing platform can be used to publish the selection tasks without departing from the scope of the disclosed embodiments. In an embodiment, the one or more remote workers can access the selection task, view details about the selection task, and choose to complete the selection task for a fee. It will be understood by a person having ordinary skills in the art that the fee for the one or more remote workers can be decided by an administrator of the crowdsourcing platform or crowdsourcer (i.e., who publishes the selection task).

In yet another embodiment, the electronic document is selected randomly from the plurality of electronic documents by the selection module 210. In an embodiment, the selection module 210 is configured to select the electronic document from the plurality of electronic documents, which have been processed by the sampling module 220. In another embodiment, the selection module 210 is configured to select the electronic document from the plurality of electronic documents, and then process the selected electronic document by the sampling module 220.

The selection module 210, after selecting the electronic document from the plurality of electronic documents, marks at least one area (i.e., a candidate area/a region of interest/a template/marked at least one area, hereafter interchangeably used) in the selected electronic document. In an embodiment, the selection module 210 may employ any suitable image processing technique which is designed and configured to identify the location of the at least one area based on various rules defined by an administrator of the system 200. It will be understood and appreciated by a person having ordinary skill in the art that the rules may vary depending on the type of the electronic document being analyzed.

In another embodiment, the selection module 210 presents the user interface to the requester for marking at least one candidate area in the selected electronic document.

In yet another embodiment, the one or more remote workers perform the marking of the at least one candidate area in the selected electronic document. The one or more remote workers identify the location of marked area based on various rules defined in the selection task.

In one embodiment, the selected electronic document is a scanned copy of the paper check. The paper check includes payer information. Herein the selection module 210 is configured to mark the area that includes payer information in the selected electronic document. The selected electronic document with the marked at least one area is stored in the database 222.

The comparator module 212 then extracts the marked at least one area from the selected electronic document of the plurality of electronic documents. It will be apparent to a person having ordinary skill in the art that any suitable known extraction technique may be employed to extract the marked at least one area from the selected electronic document of the plurality of electronic documents.

The comparator module 212 is then configured to match the marked at least one area from the electronic document of the plurality of electronic documents with the corresponding area in the remaining electronic documents of the plurality of electronic documents. In an embodiment, the comparator module 212 implements one or more pattern matching techniques to perform the matching.

In an embodiment, the comparator module 212 compares an image data of marked at least one area with an image data of one or more areas in each of the remaining electronic documents. Based on the comparison, the comparator module 212 then computes similarity between the image data of marked at least one area and the image data of one or more areas in each of the remaining electronic documents.

The comparator module 212 may employ a template matching technique to determine electronic documents containing the template. The extracted at least one area (e.g., the at least one marked area/candidate area/region of interest), referred to as a template, is iteratively compared with the corresponding area in the remaining electronic documents of the plurality of electronic documents in which it is desired to locate the template. For example, the pattern matching involves the template (e.g., the marked at least one area/candidate area/region of interest), wherein one or more instances of the template are desired to be located in the remaining electronic documents of the plurality of electronic documents. The template and the remaining electronic documents of the plurality of electronic documents are provided to a pattern-matching algorithm, which performs the pattern matching. The pattern-matching algorithm generally operates to compare the pixels in the template, or a selected subset of sample pixels, against each of the possible various locations in the remaining electronic documents of the plurality of electronic documents. Typically, the pattern-matching algorithm involves comparing the template, or a subset of sample pixels representing the template, against locations in the remaining electronic documents of the plurality of electronic documents on a horizontal pixel column basis and a horizontal scan line basis.

In other words, the comparator module 212 compares the sample pixels representing the template against a portion of the pixels in the remaining electronic documents of the plurality of electronic documents, such as by using a two-dimensional (2D) correlation. Thus, the pattern-matching algorithm generally involves comparing the template pixels against all possible locations in the remaining electronic documents of the plurality of electronic documents in an iterative fashion. The pattern matching produces the location of the template in the remaining electronic documents of the plurality of electronic documents, the quality of match and possibly the orientation, size and/or scaling of the template.

In an alternate embodiment, the comparator module 212 may generate several additional templates by scaling and/or rotating the template. In such a scenario, the comparator module 212 repeats the pattern matching process for each of the additional templates, and records the best match. Since, the additional templates are generated by scaling/rotating the template, the pattern matching is more robust against scaling and/or rotation noises in the acquisition process of each electronic document.

A person skilled in the art would understand that the scope of the disclosure should not be limited to scaling/rotating the template for producing the additional templates for the purpose of pattern matching. In another embodiment, the comparator module 212 repeats the pattern matching process for additional scaled and/or rotated versions of each electronic document. The comparator module 212 then records the best match.

Generally, prior to performing the pattern-matching algorithm, the template may be characterized. In other words, the template is characterized to represent the template with a lesser amount of data. For example, the template may be characterized by sampling a number of points or pixels, referred to as sample pixels, which are intended to characterize the template accurately. The template is characterized in this fashion because the time required for the pattern matching is generally directly proportional to the number of points or pixels representing the template, which are used in the pattern matching. Thus, the template is characterized to reduce the number of samples or pixels, which are used in the correlation operation, thereby reducing the amount of computation. Once a lesser number of sample pixels have been generated, these sample pixels are then used in the pattern-matching algorithm to locate instances of the template image in the remaining electronic documents of the plurality of electronic documents. In another example, the template may simply be averaged with its neighboring pixels (e.g., a 3×3 window) and down-sampled (e.g., a factor of 3 in horizontal and vertical direction) to reduce the data before performing pattern matching.

In another embodiment, the template is compared with portions of the remaining electronic documents of the plurality of electronic documents, for example, by utilizing a correlation-based pattern matching, e.g., using normalized two-dimensional (2D) correlation. This is performed by placing the template over the respective portion of the remaining electronic documents of the plurality of electronic documents and performing a normalized 2D correlation between the pixels in the template and the pixels in the corresponding portion of the remaining electronic documents of the plurality of electronic documents. This correlation generally produces a correlation value, which indicates the degree of correlation or match. For example, the correlation value may range between −1 and +1, wherein +1 indicates a complete match, 0 indicates no match, i.e., that the two images are uncorrelated, and −1 indicates that the two images are anti-correlated, i.e., a complete reversal of a match.

In an embodiment, for the electronic document in which the matching pattern has not been recognized, the comparator module 212 utilizes a sliding window mechanism (i.e., systematically moving the region by one or more pixels horizontally and/or vertically) to compare the region encompassed by the sliding window with the pattern in the template. Thereafter, correlation value for each region in the electronic document is determined. The region having the maximum correlation value is considered the matched pattern.

The comparator module 212 may also employ other pattern-matching algorithms. Such pattern-matching algorithms include normalized 2D correlation, geometric pattern matching, geometric color matching, logo matching, and the like. In an embodiment, the comparator module 212 stores the results of the matching in the database 222.

The scoring module 214 is configured for determining a score for each of the remaining plurality of electronic documents based on the matching. Hereinafter, the score has been interchangeably referred to as pattern-matching score. The scoring module 214 generates a pattern-matching score for each of the remaining plurality of electronic documents. In an embodiment, if the comparator module 212 employs only one pattern matching method, the scoring module 214 may consider the pattern-matching score as the final pattern match result. In another embodiment, the comparator module 212 may employ more than one pattern matching methods (e.g., any three pattern matching methods mentioned above) and the scoring module 214 may analyze the pattern-matching scores to generate the final pattern match results. Thus, if the candidate area in any of the remaining plurality of electronic documents were common to three different pluralities of candidate areas corresponding to three different pattern-matching techniques, the candidate area would have three different pattern match scores. In one example, the common candidate areas mentioned above might be culled based on the scores, discarding candidate areas whose scores fall below a threshold value. For another example, the plurality of scores corresponding to each common candidate area may be combined to generate a final score for each common candidate area, and these final scores used to determine the final match results.

In one embodiment, the scores may be combined in a weighted sum, where each score is weighted based on the particular pattern-matching technique used to determine the candidate area (and to generate the score). For example, calculating a matching score for each of the plurality of candidate areas may include calculating a raw score corresponding to each pattern-matching technique, weighting each raw score according to the corresponding pattern-matching technique to generate a set of weighted scores for the respective candidate area, and generating a matching score based on the set of weighted scores. In an embodiment, the scoring module 214 stores the scores for each of the remaining plurality of electronic documents in the database 222.

The grouping module 216 obtains the scores for each of the remaining plurality of electronic documents from the database 222, and groups the plurality of electronic documents into the one or more groups based on the score. In an embodiment, the plurality of electronic documents is present in an unorganized form. The grouping module 216 retrieves the plurality of electronic documents from the database 222 and thereafter performs the grouping of the plurality of electronic documents. The grouping module 216 thereby groups the plurality of electronic documents into the one or more groups.

In an embodiment, the grouping module 216 may group the plurality of electronic documents into the one or more groups based on a first set of criteria. According to the first set of criteria, the electronic documents with a similar score are grouped together. Therefore, based on the first set of criteria, the grouping module 216 creates the one or more groups wherein each group of the plurality of groups contains a subset of electronic documents from the plurality of electronic documents having the common score. Thus, each of the one or more groups comprises electronic documents of the plurality of electronic documents having matching areas. For example, the plurality of electronic documents may be scanned copies of a plurality of paper checks and each group of the one or more groups may comprise paper checks of the plurality of paper checks, having same payer information mentioned in the one or more areas. The payer information may be located at same location in each of the plurality of paper checks. It will be apparent to a person having ordinary skills in the art that the grouping module 216 may group the plurality of electronic documents based on various features in addition to score, for example, color, theme, objects within the electronic document, and the like.

In another embodiment, according to the first set of criteria, the electronic documents of the plurality of electronic documents having a score greater than a defined threshold/tolerance value are grouped together. In an embodiment, the threshold/tolerance value is defined such that the electronic documents from the plurality of electronic documents having matching marked areas may be grouped in multiple groups, but at the same time, the electronic documents from the plurality of electronic documents having non-matching marked areas are not put into a same group.

The selection module 210, the comparator module 212, the scoring module 214, and the grouping module 216 repeat the operation for ungrouped electronic documents until at least one of the following conditions are met:
1. all electronic documents in the database are grouped into one of the groups,
2. the number of ungrouped electronic documents is below a first pre-determined threshold, or
3. the number of iterations performed exceeds a second pre-determined threshold.

In an embodiment, the grouping module 216 may be implemented using various grouping techniques capable of grouping the plurality of electronic documents.

The validation module 218 is configured for validating the one or more groups, wherein validating comprises checking whether each of the one or more groups has electronic documents of the plurality of electronic documents having matching areas.

In one embodiment, the validation module 218 may also create a validation task corresponding to each of the one or more groups for the one or more crowdworkers. In an embodiment, the validation module 218 prepares the validation tasks, which are then published on a crowdsourcing platform from where it may be accessed/attempted by the one or more crowdworkers. It will be understood by a person having ordinary skill in the art that any suitable crowdsourcing platform can be used to publish the validation tasks without departing from the scope of the disclosed embodiments. In an embodiment, one or more crowdworkers may access the validation task, view details about the validation task, and choose to complete the validation task for a fee. It will be understood by a person having ordinary skill in the art that the fee for the one or more crowdworkers may be decided by an administrator of the crowdsourcing platform or crowdsourcer (i.e., who publishes the validation task).

In an embodiment, the validation task includes two sub-tasks. The first sub-task of the validation task includes the visualization of each electronic document in the corresponding group of the one or more groups. Herein the crowdworker checks whether group of the one or more groups that are allocated to that crowdworker has electronic documents of the plurality of electronic documents with matching areas. In case the group has electronic documents of the plurality of electronic documents that has unmatching areas, then the second sub-task of the validation task is initiated. The second sub-task includes the manual arrangement of unmatched electronic documents of the plurality of electronic documents in their designated group of the one or more groups. The validation module 218 may facilitate sending of the validation task to one crowdworker. The validation module 218 may also facilitate sending of the validation task to multiple crowdworkers.

In another embodiment, the validation module 218 validates the one or more groups by applying one or more character recognition techniques. In this embodiment, the OCR techniques need not correctly decode the text images. The validation can be achieved by confirming whether similar OCR results are obtained within a group.

In yet another embodiment, the validation module 218 presents a user interface to the requester, for validating the one or more groups.

Figure 3:
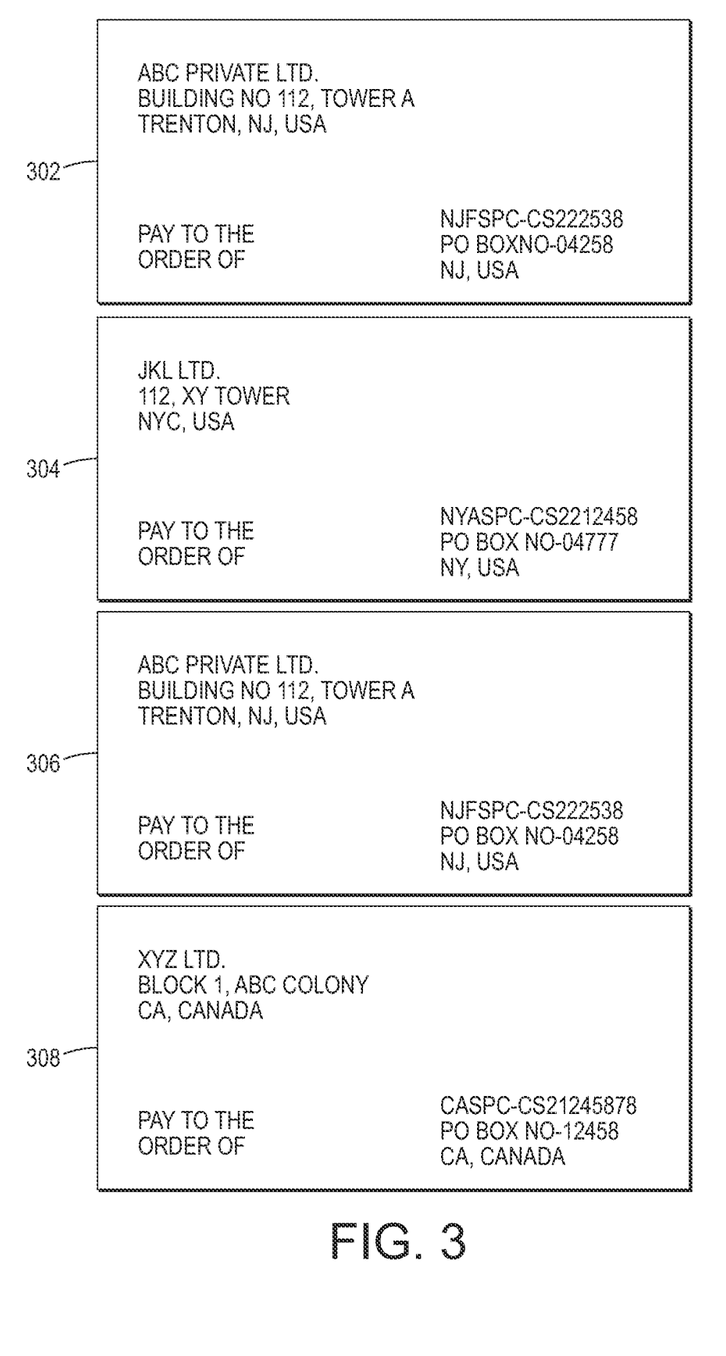
FIG. 3 depicts a plurality of electronic documents, in accordance with at least one embodiment.

FIG. 3 depicts a plurality of electronic documents, in accordance with at least one embodiment. The plurality of electronic documents includes a first electronic document 302, a second electronic document 304, a third electronic document 306, and a fourth electronic document 308. Here in each of the plurality of electronic documents (302, 304, 306, and 308) is a scanned copy of a plurality of paper checks.

Figure 4:
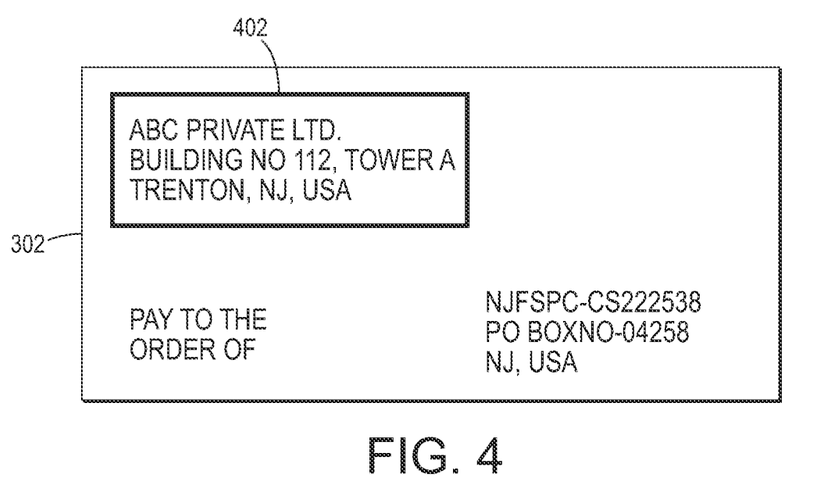
FIG. 4 depicts at least one marked electronic document of the plurality of electronic documents, in accordance with at least one embodiment.

FIG. 4 depicts the at least one marked electronic document of the plurality of electronic documents, in accordance with at least one embodiment. The selection module 210 randomly selects the first electronic document 302 from the plurality of electronic documents (the first electronic document 302, the second electronic document 304, the third electronic document 306, and the fourth electronic document 308). Thereafter, the selection module 210 marks an area 402 (that includes payer information) in the selected first electronic document 302.

In another embodiment, the selection module 210 is configured to transmit the plurality of electronic documents (the first electronic document 302, the second electronic document 304, the third electronic document 306, and the fourth electronic document 308) to one or more remote workers. In order to transmit, the selection module 210 creates a selection task corresponding to the plurality of electronic documents (the first electronic document 302, the second electronic document 304, the third electronic document 306, and the fourth electronic document 308) for the one or more remote workers. Thus, based on various rules defined in the selection task, the one or more remote workers selects the first electronic document 302, and then marks the area 402 (that includes payer information) in the selected first electronic document 302.

Figure 5:
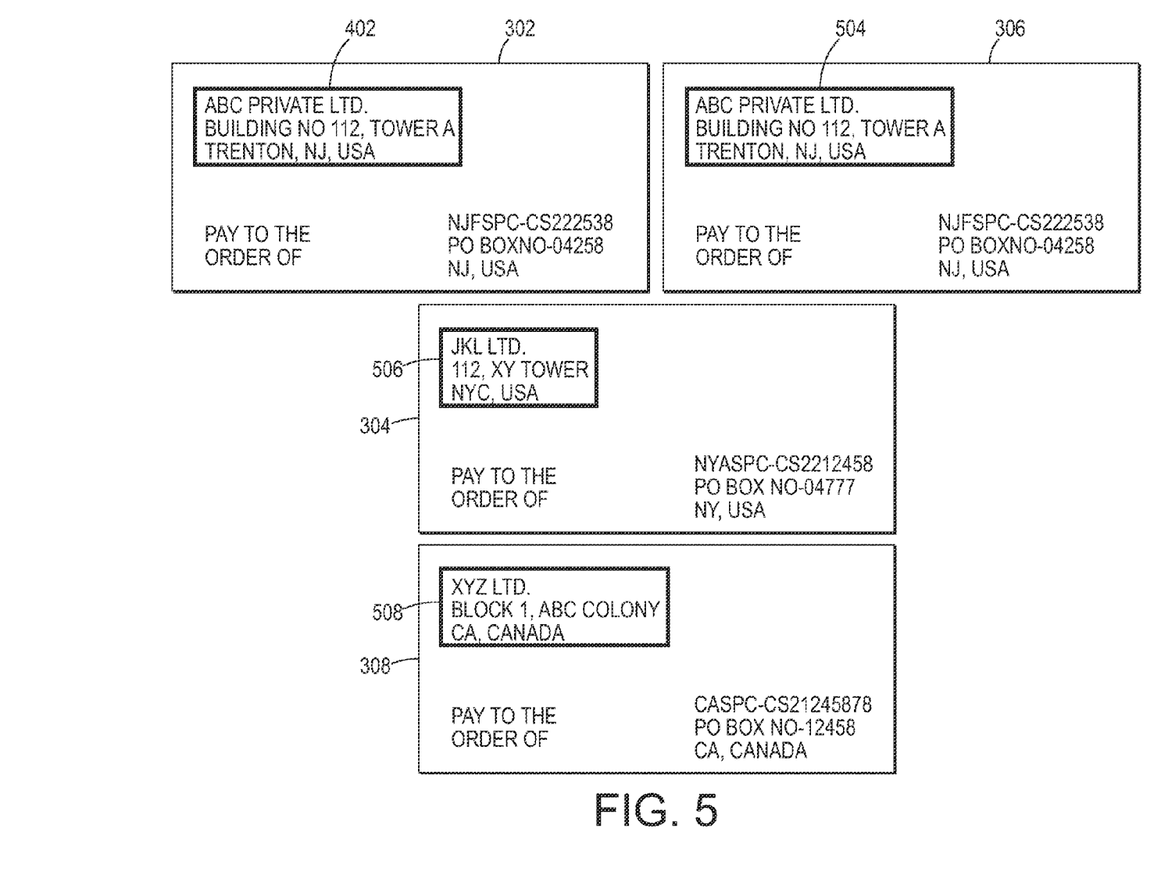
FIG. 5 depicts one or more groups comprising one or more of the plurality of electronic documents, in accordance with at least one embodiment.

FIG. 5 depicts one or more groups comprising one or more of the plurality of electronic documents, in accordance with at least one embodiment. The comparator module 212 then facilitates the matching of the marked at least one area 402 in the first electronic document 302 with the corresponding area (504, 506, and 508) in the remaining electronic documents (the second electronic document 304, the third electronic document 306, and the fourth electronic document 308). Based on the matching, the scoring module 214 then determines a score for each of the remaining plurality of electronic documents (the second electronic document 304, the third electronic document 306, and the fourth electronic document 308). Based on the scores assigned by the scoring module 214, the grouping module 216 then facilitates the grouping of the plurality of electronic documents (the first electronic document 302, the second electronic document 304, the third electronic document 306, and the fourth electronic document 308) in one or more groups. In the present example as shown in FIG. 5, it is seen that the first electronic document 302 and the second electronic document 304 have same matching areas 402 and 504, and therefore assigned in one group. The third electronic document 306 and the fourth electronic document 308 do not have any similar matching areas; therefore each one forms a separate group.

Figure 6:
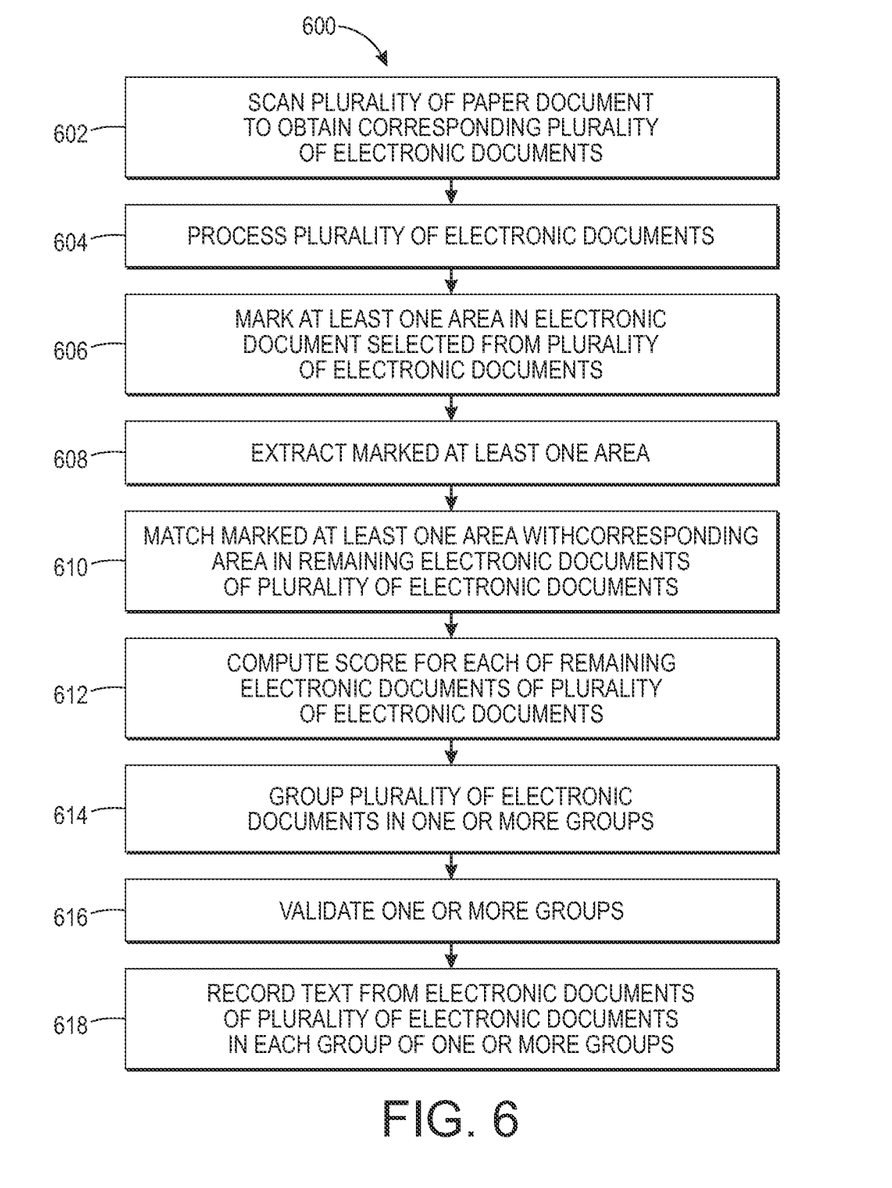
FIG. 6 is a flowchart illustrating a method for processing a plurality of electronic documents, in accordance with at least one embodiment.

FIG. 6 is a flowchart 600 illustrating a method for processing a plurality of electronic documents, in accordance with at least one embodiment.

At step 602, a plurality of paper documents is scanned to obtain a corresponding plurality of electronic documents. In an embodiment, the system 200 includes the image-scanning equipment (not shown), which is capable of scanning the plurality of paper documents to generate a corresponding plurality of electronic documents. Once the scanning is complete, the image-scanning equipment stores the plurality of electronic documents in the database 222. In an alternative embodiment, the system 200 receives the electronic documents (e.g., the scanned paper documents) from a scanner or a multifunction device connected in the network 102.

At step 604, the plurality of electronic documents is processed. In an embodiment, the plurality of electronic documents is obtained by the sampling module 220 from the database 222. After obtaining the plurality of electronic documents, the sampling module 220 is configured to process them to mitigate at least one of scan noise or the one or more watermarks present in the plurality of electronic documents. The processing of the electronic documents to mitigate the scan noise and/or the watermarks may include a combination of smoothing (via averaging and/or down-sampling) and morphological filtering, which is applied by the sampling module 220. For example, if the electronic document (e.g., a scanned copy of a paper check) is not binarized, then binarization of the electronic document is first performed by using thresholding techniques like Otsu's method. Thereafter, the down-sampling is performed via pixel value averaging (e.g., average of 2×2 pixels becomes a single pixel). In addition, binarizing is again performed on the down-sampled electronic document; a simple threshold of 0.5 can be used for this step since it has been binarized previously. Then, morphological filtering such as open and/or close with pre-defined structure (e.g., a 5×5 block) is performed. The processed plurality of electronic documents are then stored in the database 222.

At step 606, at least one area is marked in an electronic document selected from the plurality of electronic documents. In an embodiment, the electronic document is selected randomly from the plurality of electronic documents by the selection module 210. In one embodiment, the selection module 210 is configured to select the electronic document from the plurality of electronic documents that are processed by the sampling module 220. In another embodiment, the selection module 210 is configured to select the electronic document from the plurality of electronic documents, and then process the selected electronic document by the sampling module 220.

The selection module 210 after selecting the electronic document from the plurality of electronic documents marks at least one area in the selected electronic document. In an embodiment, selection module 210 may employ any suitable image processing technique which is designed and configured to identify the location of the at least one area based on various rules defined by an administrator of the system 200.

In yet another embodiment, the selection module 210 is configured to transmit the plurality of electronic documents to one or more remote workers. In order to transmit, the selection module 210 creates a selection task corresponding to the plurality of electronic documents for the one or more remote workers. Thus, based on various rules defined in the selection task, the one or more remote workers selects the electronic document from the plurality of electronic documents, and then marks the at least one area in the selected electronic document.

At step 608, at least one marked area is extracted. In an embodiment, the at least one marked area from the electronic document is extracted by the comparator module 212. It will be apparent to a person having ordinary skills in the art that any suitable known extraction technique may be employed to extract the marked at least one area from the selected electronic document.

At step 610, the marked at least one area is matched with corresponding area in the remaining electronic documents of the plurality of electronic documents. In an embodiment, the matching is performed by the comparator module 212. In an embodiment, the comparator module 212 implements one or more pattern matching techniques (described above) to perform the matching.

At step 612, a score is computed for each of the remaining electronic documents of the plurality of electronic documents based on the matching. In an embodiment, the scoring is facilitated by the scoring module 214. The scoring module 214 is configured for determining the score for each of the remaining plurality of electronic documents based on the matching. The scoring module 214 generates a pattern matching score for each of the remaining plurality of electronic documents. The scoring module 214 then analyzes the pattern matching scores to generate the final pattern match results. The final scores for each electronic document of the plurality of electronic documents are stored in the database 222.

At step 614, the plurality of electronic documents is grouped in one or more groups based on the score. In an embodiment, the scores for each of the remaining electronic documents is obtained by the grouping module 216, which is then configured for grouping the plurality of electronic documents in one or more groups based on the score. In an embodiment, the grouping module 216 retrieves the plurality of electronic documents from the database 222 and thereafter performs the grouping of the plurality of electronic documents to group the plurality of electronic documents. The grouping module 216 thereby groups the plurality of electronic documents in one or more groups.

At step 616, the one or more groups are validated by at least one of a remote worker or by applying one or more character recognition techniques. In an embodiment, the validation module 218 is configured for validating the one or more groups by applying one or more character recognition techniques. In order to validate, each of the one or more groups is checked to confirm whether each of the one or more groups has electronic documents of the plurality of electronic documents having matching areas.

At step 618, the text is recorded from electronic documents of the plurality of electronic documents in each group of the one or more groups.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from an employee through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to employee commands, results of previous processing, or a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to, improving the accuracy of digitization of textual fields in electronic documents by applying multiple OCR/ICR engines or multiple image pre-processing techniques. Further the processing of printed documents by present disclosure greatly reduces human effort while at the same time provides appropriate level of visual inspection with a human in the loop.

Various embodiments of the method and system for processing of electronic documents have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method implementable on a computing device for processing a plurality of electronic documents, the method comprising:

marking, by a graphics processing unit in the computing device, at least one area in an electronic document selected from the plurality of electronic documents, wherein the plurality of electronic documents is received by the graphics processing unit from a multifunction device over a computer network;

matching, by the graphics processing unit in the computing device, the marked at least one area with corresponding area in the remaining electronic documents of the plurality of electronic documents;

computing, by the graphics processing unit in the computing device, a pattern matching score for each of the remaining electronic documents of the plurality of electronic documents based on the matching;

grouping, by the graphics processing unit in the computing device, the plurality of electronic documents in one or more groups based on the pattern matching score, wherein the method is performed iteratively by a processor in the computing device until at least one of one or more conditions are met, wherein the one or more conditions comprise at least one of each of the plurality of electronic documents is grouped in one of the one or more groups, a number of ungrouped electronic documents is less than a first pre-determined threshold, or a number of iterations performed is more than a second pre-determined threshold; and recording, by the graphics processing unit in the computing device, accurate text from electronic documents of the plurality of electronic documents in each group of the one or more groups in a database.

2. The method of claim 1, wherein the electronic document is selected from the plurality of electronic documents.

3. The method of claim 1, wherein the matching is performed by applying one or more pattern matching techniques.

4. The method of claim 1 further comprising validating, by the graphics processing unit in the computing device, whether the marked at least one area in each electronic document grouped within a group from the one or more groups are matching.

5. The method of claim 4, wherein the validating is performed by at least one of a remote worker or by applying one or more character recognition techniques.

6. The method of claim 1, wherein the plurality of electronic documents comprises scanned copies of a plurality of paper checks.

7. The method of claim 6, wherein the marked at least one area on each of the plurality of paper checks comprises a payer information.

8. The method of claim 7, wherein each group of the one or more groups comprises paper checks from the plurality of paper checks, having same payer information in the one or more areas.

9. The method of claim 8, wherein the payer information is located at same location in each of the plurality of paper checks.

10. The method of claim 1 further comprising processing, by the graphics processing unit in the computing device, each of the plurality of electronic documents to mitigate at least one of a scan noise or one or more watermarks.

11. A method implementable on a computing device for processing a plurality of paper checks, the method comprising:

receiving, by a graphics processing unit in a computing device, a plurality of electronic documents representing a scanned copies of the plurality of paper checks to obtain a plurality of electronic documents;

marking, by the graphics processing unit in the computing device, at least one area in an electronic document selected from the plurality of electronic documents;

matching, by the graphics processing unit in the computing device, the marked at least one area with corresponding area in the remaining electronic documents of the plurality of electronic documents;

computing, by the graphics processing unit in the computing device, a pattern matching score for each of the remaining electronic documents of the plurality of electronic documents based on the matching;

grouping, by the graphics processing unit in the computing device, the plurality of electronic documents in one or more groups based on the pattern matching score such that a number of ungrouped electronic documents is less than a first pre-determined threshold;

validating, by the graphics processing unit in the computing device, whether the marked at least one area in each electronic document grouped within a group from the one or more groups are matching, wherein the method is performed by one or more processors in the computing device; and recording, by the graphics processing unit in the computing device, accurate text from electronic documents of the validated plurality of electronic documents in each group of the one or more groups in a database.

12. A system for processing a plurality of electronic documents, the system comprising:
a memory comprising one or more program instruction modules, wherein the one or more program instructions modules comprise:
a selection module configured for:
selecting an electronic document from the plurality of electronic documents, and
marking at least one area in the selected electronic document,
a comparator module configured for matching the marked at least one area with corresponding area in the remaining electronic documents of the plurality of electronic documents,
a scoring module configured for determining a pattern matching score for each of the remaining plurality of electronic documents based on the matching, and
a grouping module configured for grouping the plurality of electronic documents in one or more groups based on the pattern matching score such that a number of ungrouped electronic documents is less than a first pre-determined threshold; and
a graphics processing unit operable to execute the one or more program instruction modules and record accurate text from electronic documents of the plurality of electronic documents in each group of the one or more groups in a database.

13. The system of claim 12, wherein the one or more program instruction modules, executed by the graphics processing unit in the computing device, further comprise a validation module configured for validating the one or more groups by applying one or more character recognition techniques.

14. The system of claim 12, wherein the one or more program instruction modules, executed by the graphics processing unit in the computing device, further comprise a sampling module configured to mitigate at least one of scan noise or one or more watermarks.

15. The system of claim 12, wherein the plurality of electronic documents comprises scanned copies of a plurality of paper checks.

16. A computer program product for use with a computing device, the computer program product comprising a non-transitory computer-usable medium having a computer readable program code embodied therein for processing a plurality of electronic documents, the computer readable program code executable by a graphics processing unit in the computing device for:
marking at least one area in an electronic document selected from the plurality of electronic documents;
matching the marked at least one area with corresponding area in the remaining electronic documents of the plurality of electronic documents;
computing a pattern matching score for each of the remaining electronic documents of the plurality of electronic documents based on the matching;
grouping the plurality of electronic documents in one or more groups based on the pattern matching score such that a number of ungrouped electronic documents is less than a first pre-determined threshold; and
recording accurate text from electronic documents of the plurality of electronic documents in each group of the one or more groups in a database.

17. The computer program product of claim 16, wherein the computer readable program code is further executable for validating whether the marked at least one area in each electronic document grouped within a group from the one or more groups are matching.

18. The computer program product of claim 17, wherein the validating is performed by at least one of a remote worker or by applying one or more character recognition techniques.

* * * * *